W. JAY.
INDICATOR FOR FUEL TANKS.
APPLICATION FILED MAY 8, 1918
1,308,905.
Patented July 8, 1919.
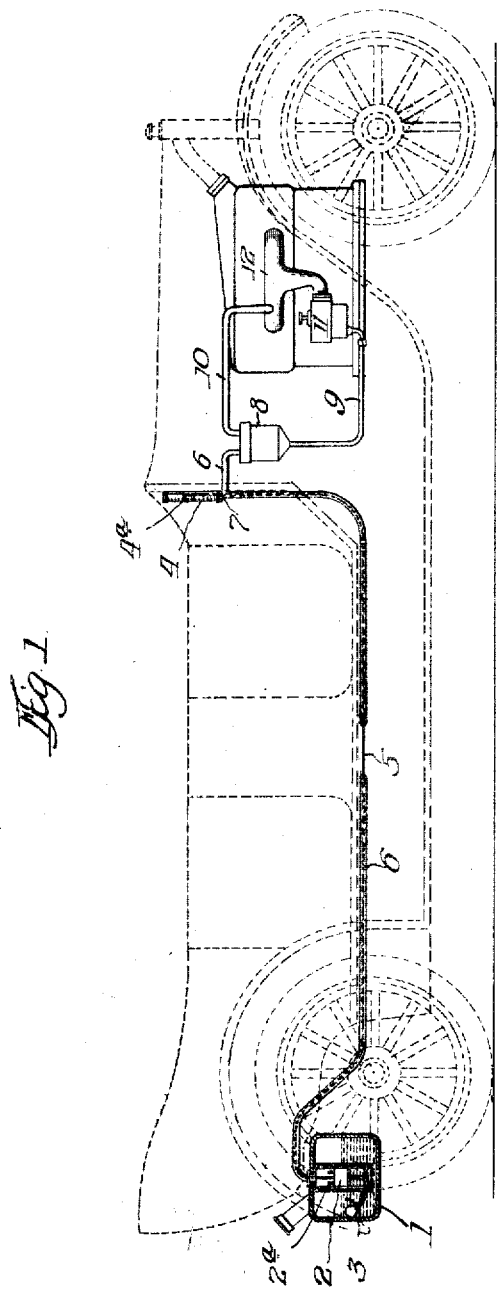
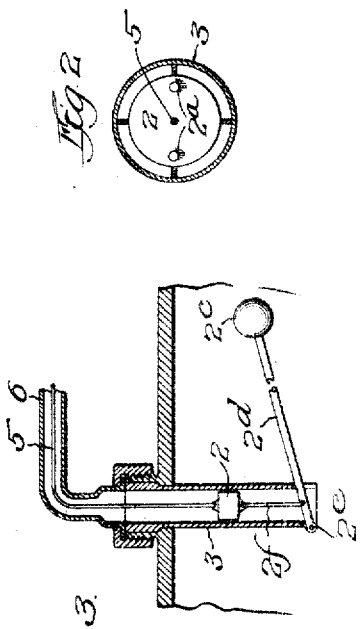
Witness
Fred Rurais
Inventor
Webb Jay.
By Wilkinson & Hurley
Attys

UNITED STATES PATENT OFFICE.

WEBB JAY. OF CHICAGO, ILLINOIS.

INDICATOR FOR FUEL-TANKS.

1,308,905.   Specification of Letters Patent.   Patented July 8, 1919.

Application filed May 8, 1918. Serial No. 233,279.

*To all whom it may concern:*

Be it known that I, WEBB JAY, a citizen of the United States, residing at Chicago, in the county of Cook, State of Illinois, have invented a new and useful Improvement in Indicators for Fuel-Tanks, of which the following is a specification.

One object of the present invention is to provide at a point convenient for observation, as for instance upon the dash or instrument board of an automobile, an indicator that will show the level of the liquid fuel in the tank at all times and will act satisfactorily notwithstanding the remoteness of the tank, for instance at the rear end of the car at a lower level than the indicator, and the circuitous course of the connection through which the indicating movement has to be communicated, to accomplish this with small expense, and to maintain proper operative condition of the connector in the conduit. To these ends one feature of the invention consists in the employment of a pipe as a conduit through which to lead a suitable mechanical connection between an approved type of indicator upon the dash and some available form of actuator therefor associated with the fuel tank, such as a level measuring device, or other means affected by the quantity of fuel in the tank or by its movement in leaving the tank for the point of consumption, the pipe in this organization being the same pipe that serves to conduct the liquid fuel from the fuel tank toward the point of consumption, a point of distribution or a provisional or subsidiary tank or container; the adaptation being such that the liquid fuel serves as a lubricant for the mechanical connector and maintains a proper condition within the conduit to insure proper operation.

A further object is to bring the mechanical connector, in its guiding conduit, under a mechanical influence that will serve as a further safeguard against binding or sluggishness of action of the indicator-connection as well as to prevent accumulation of sediment in the conduit; also to provide means for indicating the action or operative condition of the known types of vacuum feed system employed on motor vehicles. To these ends a further feature consists in combining with the fuel feed pipe in a vacuum fuel feed system, a pulsometer that will indicate the action of flow-inducing means; or defined more specifically with reference to the embodiment selected herein for illustration, a further feature consists in locating the mechanical connector for the indicator in the feed conduit between the tank and the vacuum chamber of the vacuum feed device named and to bring the measuring device within the tank, for instance a piston-float in the suction tube of the tank, under the influence of the pulsations developed in the conduit and tube, so that frequent reciprocating movement is developed in the mechanical connector and its freely operating condition maintained while the reproduction of these movements in the indicator upon the dash, will at all times disclose the efficiency with which the vacuum system is working.

In order that the invention may be fully understood, one embodiment thereof is illustrated in the accompanying drawings and described in detail in the following specification; but this disclosure is to be taken as illustrative merely and not definitive of the scope of the invention, the latter being particularly indicated in the appended claims.

In said drawings Figure 1 is a schematic view illustrating an embodiment of the invention capable of realizing all of the objects above recited, and in which the preferred form of measuring device is illustrated in the tank.

Fig. 2 is a detailed view of the buoyancy controlled follower shown in Fig. 1.

Fig. 3 is a view on an enlarged scale of the measuring device which reduces the range of movement transmitted from the float to the indicator.

1 represents a fuel tank such as is commonly employed on a motor vehicle and which is here shown located at the rear end of the vehicle and therefore not conveniently accessible for ascertaining the supply of fuel remaining unconsumed.

2 represents a buoyancy-controlled follower guided within the suction pipe 3 of the tank, and is employed in those embodiments of the invention in which all of its advantages are to be realized, namely, those incident to indicating the fluid level as well as those which have to do with disclosing the efficiency of the vacuum feed. While in the fluid level indicator the follower 2 is merely a part of the connection between the float and the indicator, for purposes of indicating the action of the vacuum feed it serves as a pulsometer.

The present invention provides means whereby an indicator 4 may be located upon the dash or instrument board at the forward end of the vehicle and connected up with the follower 2 in a manner to become accurately responsive to the position and movements of the follower within the tank. To accomplish this result, a relatively small flexible wire 5 located within a conduit 6, is connected at one end with the index 4ª of the indicator 4 and at its other end with the follower 2 in the tank 1. The conduit 6 has sufficiently great flexibility to permit it to be led through any convenient course from the tank to the indicator and suitably attached to parts of the vehicle where it will be free from injury, and the flexibility of the wire within it permits this to be done without interfering with the operativeness of the wire. As a result of this combination the index 4ª will accurately show the stage of the fluid level in the tank and thus enable the operator to know at all times the reserve supply of fuel available.

The conduit 6 is made identical with the conduit through which the fuel flows from the tank to a point of consumption, distribution, or provisional storage as this keeps the conduit filled with liquid and keeps the wire lubricated and incidentally may avoid lodgment of sediment in the conduit.

Of especial advantage is the feature of having the mechanical connector located in the fuel conduit when the latter forms part of a vacuum feed system, in the operation of which the fuel has more or less of a pulsating action, and particularly when the pipe 3 within the tank is not only the guide for the follower 2 but also serves as the suction pipe through which the fuel responds to the suction in the conduit. For the full and satisfactory realization of this last named condition, the follower 2 constitutes a piston in the sense that while it is made to fit its guide loosely so that there is space for passage of the fuel around the piston this space is sufficiently restricted to cause the piston to respond to the pulsations of the lifting vacuum. Also, there is preferably provided means to prevent the piston from closing the intake end of the conduit 6, for instance spacing lugs or stops 2ª.

An important advantage of combining the new indicator with a vacuum feed system arises from the indication of the pulsations of the vacuum as well as the level of the fuel in the tank. Thus it becomes possible to know at all times when the engine is running, whether or not the fuel is being properly forwarded to the vacuum chamber. If for instance the pulsations are sluggish and infrequent the operator is at once apprised of an impairment in the suction connections. Thus the known types of vacuum feed system which are necessarily inclosed and ordinarily obscured from inspection, become conveniently observable and subject to adjustment or repair as soon as their efficiency begins to drop instead of when they reach a condition to seriously interfere with the operation of the motor.

In the application of the invention to the vacuum feed system, the mechanical connection 5 of the indicator will be deflected from the conduit 6 through a branch 7 to the indicator 4 and this branch as well as the indicator or the gage-tube thereof will be hermetically sealed so as to avoid interference with the action of the vacuum feed.

8 represents the suction chamber of a vacuum feed system with which the conduit 6 is connected, and 9 and 10 the usual connections leading from the vacuum chamber, respectively, to the carbureter 11 and the manifold or other suction member 12 of an internal combustion engine.

It will be understood that in a vacuum feed system of the type referred to, the vacuum acts upon the fuel tank through the fuel conduit 6 only at intervals when a float within the provisional fuel chamber of the vacuum apparatus, has descended; hence there are intervals when the indicator will be free from pulsation and accurately show the level of the fuel in the tank, and it is only when the vacuum lift is taking place, that the indicator shows the pulsations thereof. Thus the indicator may be said to serve alternatively for indicating the two conditions although the level is roughly indicated even when pulsations exist.

I claim:

1. A remote indicator for fuel tanks comprising a fuel feed conduit through which liquid fuel flows toward a point of consumption, a device adapted to be located in the fuel tank and to develop mechanical movements from changes of level of liquid therein, a mechanical connector leading from said float and extending through and exposed to contact with the liquid in the fuel conduit and an indicating device controlled by said connector.

2. A remote indicator for fuel tanks, comprising a fuel feed conduit, a device adapted to be located in the fuel tank and to develop mechanical movements from changes of level of liquid therein, a mechanical connector leading from said device and extending through the fuel conduit and an indicating device controlled by said connector; said connector comprising a flexible wire adapted to conform with deflections in the fuel conduit and exposed to contact of the fuel therein and said conduit, having, at a point toward the indicating device, a diverging passage through which said wire leaves the conduit.

3. A remote indicator for fuel tanks, comprising a fuel feed conduit, a device adapted to be located in the fuel tank and to develop mechanical movements from changes of level of liquid therein, a mechanical connector leading from said device and extending through the fuel conduit and an indicating device controlled by said connector; said connector comprising a flexible wire adapted to conform with deflections in the fuel conduit and exposed to contact of the liquid fuel therein, said conduit having, at a point toward the indicating device, a diverging passage through which said wire leaves the conduit and said indicating device communicating with said divergent passage and receiving the wire therefrom.

4. A remote indicator for fuel tanks, comprising a fuel feed conduit, an actuating device adapted to be located in the fuel tank and to develop mechanical movements from changes of level of liquid therein, a mechanical connector leading from said device and extending through the fuel conduit and an indicating device controlled by said connector; said connector comprising a flexible wire adapted to conform with deflections in the fuel conduit and exposed to contact of the liquid fuel therein, and said conduit having, at a point toward the indicating device, a diverging passage through which said wire leaves the conduit; said measuring device being adapted to impart endwise movement to said wire.

5. A remote indicator for fuel level in tanks operated by vacuum feed system, comprising an indicating device, an actuating device adapted to be located within the fuel tank, a conduit through which fuel is drawn by the vacuum system and a mechanical connection leading from the actuating device through said conduit to the indicating device.

6. A remote indicator for fuel level in tanks operated by vacuum feed system, comprising an indicating device, an actuating device adapted to be located within the fuel tank, a conduit through which fuel is drawn by the vacuum system and a mechanical connection leading from the actuating device, through said conduit to the indicating device; said actuating device being subject to pulsations of the vacuum feed system and adapted to develop therefrom movements in the mechanical connection.

7. A remote indicator for fuel level in tanks operated by vacuum feed system, comprising an indicating device, an actuating device adapted to be located within the fuel tank, a conduit through which fuel is drawn by the vacuum system and a mechanical connection leading from the measuring device, through said conduit to the indicating device; said measuring device being subject to pulsations of the vacuum feed system and adapted to develop therefrom movements in the mechanical connection, and the indicating device being adapted to show movements resulting from the pulsations as well as movement resulting from changes in level in the tank.

8. A remote indicator for fuel level in tanks operated by vacuum feed system, comprising an indicating device, an actuating device adapted to be located within the fuel tank, a conduit through which fuel is drawn by the vacuum system and a mechanical connection leading from the actuating device, through said conduit to the indicating device; the indicating device being in hermetic communication with the fuel conduit and receiving the mechanical connector therefrom.

9. In combination with a vacuum fuel feed system for motor vehicles a pulsation indicator responsive to pulsations set up in the feeding system.

10. In combination with the fuel-feed conduit of a vacuum fuel feed system for motor vehicles, an indicator connected with said conduit, and means within said conduit whereby said indicator is rendered responsive to both fluid level in the fuel tank and pulsations of the vacuum feed acting upon the fuel.

11. A self indicating vacuum fuel feed system for motor vehicles, comprising a suction pipe adapted to communicate with a fuel supply, a piston responsive to suction within said pipe, a fuel conduit communicating with said pipe and adapted to draw liquid fuel therefrom by suction, vacuum developing mechanism in communication with said conduit, a mechanical connector within said conduit, connected with said piston and adapted to transmit movements developed in said piston and an indicating device controlled by said connector.

12. A self indicating vacuum fuel feed system for motor vehicles, comprising a suction pipe adapted to communicate with a fuel supply, a piston responsive to suction within said pipe and to changes of the fuel level in the tank, a fuel conduit communicating with said pipe and adapted to draw liquid fuel therefrom by suction, vacuum developing mechanism in communication with said conduit, a mechanical connector within said conduit, connected with said piston and adapted to transmit movements developed in said piston and an indicating device controlled by said connector.

13. A self indicating vacuum fuel feed system for motor vehicles, comprising a suction pipe adapted to communicate with a fuel supply, a piston located within said pipe and responsive to changes of the fuel level in the tank, a fuel conduit communicating with said pipe and adapted to draw liquid fuel therefrom by suction, vacuum developing mechanism in communication with said conduit, a mechanical connector within said conduit, connected with said piston and adapted to transmit movements developed in said piston and an indicating device controlled by said connector; said indicating device embodying a hermetically closed hollow member connected through a branch opening with said conduit and receiving the connector through the latter.

14. In a self indicating vacuum fuel feed system for motors, a suction pipe adapted to communicate with a fuel supply and with the vacuum-inducing means of the system, a piston-like member in said suction pipe, responsive to movement of fuel therein, and an indicator adapted to indicate movement of the piston-like member.

15. A self indicating vacuum fuel feed system, comprising a suction pipe, a piston in said pipe having a by-pass for liquid fuel but responsive to movements of fuel occurring in the pipe, and an indicator responsive to movements of the piston.

16. A self indicating vacuum fuel feed system, comprising a suction pipe, a piston in said pipe having a by-pass for liquid fuel but responsive to movements of fuel occurring in the pipe, a float in said tank having movement-reducing connection with said piston, and an indicator responsive to movements of the piston.

17. A self indicating vacuum fuel feed system, comprising a suction pipe, a piston in said pipe having a by-pass for liquid fuel but responsive to movements of fuel occurring in the pipe, a lever fulcrumed on said pipe and connected with the piston, a float carried by said lever and offset thereby from said pipe, and an indicator responsive to movements of the piston.

Signed at Chicago, State of Illinois, this 4th day of May, A. D., 1912.

WEBB JAY.

Witnesses:
 Hervey S. Knight,
 S. E. Hansen.